Dec. 5, 1939.  C. H. PARSONS  2,182,212
LABELED CHEESE PACKAGE
Filed Oct. 27, 1937
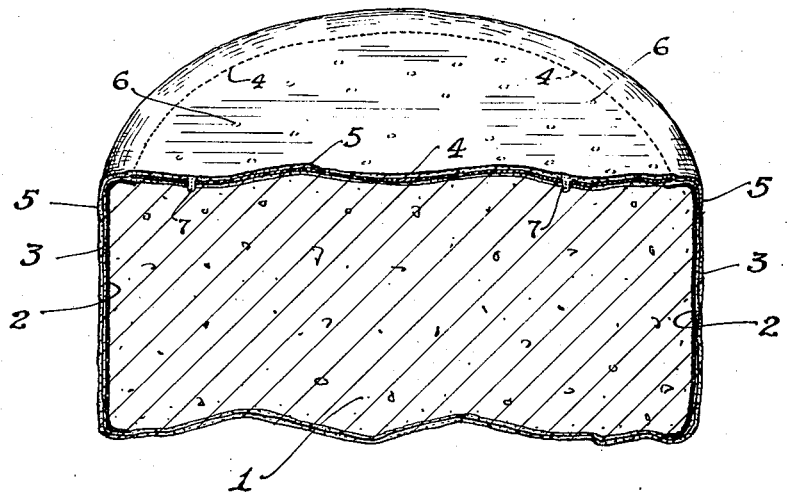
ATTEST-
Wm. C. Meiser
Clinton H. Parsons
INVENTOR
BY
ATTORNEY Patented Dec. 5, 1939

2,182,212

UNITED STATES PATENT OFFICE 2,182,212

LABELED CHEESE PACKAGE

Clinton H. Parsons, Chicago, Ill., assignor to Industrial Patents Corporation, Chicago, Ill., a corporation of Delaware Application October 27, 1937, Serial No. 171,383

4 Claims. (Cl. 216—62)

This invention relates to an improved cheese package.

One of the objects of the invention is to provide an improved labeled cheese package.

Another object of the invention is to provide an improved method of applying labels to cheese.

Other objects of the invention will be apparent from the description and claims which follow.

The present invention is of particular value in applying labels in the preparation of cheese packages in accordance with the teachings of the invention described and claimed in my copending application entitled Cheese package, Serial No. 170,263, filed October 21, 1937, now matured into Patent No. 2,155,736, Apr. 25, 1939, but it will be readily apparent that the present invention is applicable to the affixation of labels to any wax or paraffin covered cheese packages.

The present invention will be readily understood by reference to the drawing which is a perspective view of a portion of cheese, partly in section. It will be noted that the cheese 1 is provided with bandage 2 covered with paraffin 3 to which has been applied label 4 embedded in secondary wax covering 5.

For purposes of clarity the coverings are relatively enlarged in the drawing.

It will be noted that wax passing through perforations 6, forms wax pegs 7.

In the manufacture of cheese the curd is normally pressed in a mold, the mold having first been lined, in whole or in part, with cheesecloth, forming a bandage embedded in the surface of the molded curd. After the curd is removed from the mold, which may be cylindrical in form, it is dried for a few days and then dipped in paraffin, after which the paraffined cheese is permitted to age the desired length of time.

Since most cheeses are manufactured in small independent cheese factories and marketed by large food distributors, a problem arises in the identification of cheese of selected grade sold by a given food distributor. The present invention affords a method for the application of identifying indicia.

In carrying out the present invention a paper label bearing the desired printing is dipped in hot wax and placed on the paraffined cheese. The paper is then preferably perforated in numerous places. This may be done by tapping the label after it has been placed on the paraffined coating with a piece of wood through which a number of small nails or brads have been driven whereby the points of the brads penetrate through the label into the paraffin and slightly into the cheese below. After this is done the label is pressed with a hot iron which melts the wax in which the label has been dipped and the paraffin beneath, causing the paraffin to run into the small wells which have been formed by the brads with the result that the label is covered with a film of wax continuous with the film of wax or paraffin around the cheese and with the result that the outer film of wax, and consequently the label, is affixed to the cheese by numerous small wax pegs which fill up the depressions that have been made through the label and into the paraffin and cheese below.

In carrying out the invention it is preferable to employ for the label, paper which is porous or semiporous made from short fiber stock. A cheap grade of wood pulp paper is excellent for the purpose since such paper readily absorbs the hot wax. Furthermore, the cheaper grade of paper lacks sufficient strength for digital removal in one piece, and is, therefore, more adherent to the cheese.

It will be understood, of course, that any desired wax or paraffin may be employed for soaking the label. However, I prefer to employ the wax which is described and claimed in my copending application entitled Wax, Serial No. 170,264, filed October 21, 1937.

It will be understood that some of the details which have been described may be varied without departing from the spirit of the invention as defined in the claims which follow.

I claim:

1. A cheese package comprising a body of cheese covered with paraffin and bearing a waxed label, the wax of the label being bonded to the wax covering of the cheese package and having wax pegs extending through the label and into the body of the cheese.

2. The method of applying a label to a waxed body of cheese which comprises waxing a label, placing the waxed label on the surface of the wax on the cheese, forming wells through the label and the paraffin layer on the cheese of sufficient depth to penetrate the body of the cheese and bonding the label to the cheese by the application of heat.

3. The methd of applying a label to a waxed body of cheese which comprises waxing a label, placing the waxed label on the surface of the wax on the cheese, forming wells through the label and the paraffin layer on the cheese of sufficient depth to penetrate the body of the cheese and bonding the label to the cheese by the application of heat and the formation of wax pegs passing through the label and filling such wells.

4. The method of applying a label to a waxed body of cheese which comprises waxing a label, placing the waxed label on the surface of the wax on the cheese, forming wells through the label and the paraffin layer on the cheese of sufficient depth to penetrate the body of the cheese and bonding the label to the cheese by the formation of wax pegs passing through the label and filling such wells.

CLINTON H. PARSONS.